Patented July 7, 1931

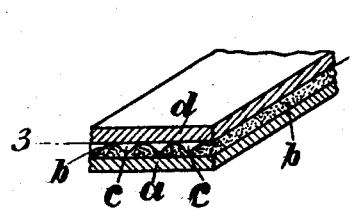
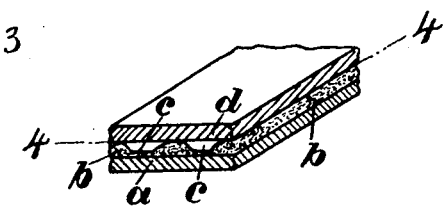
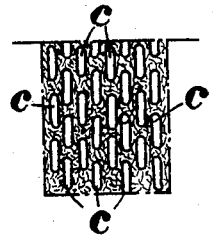
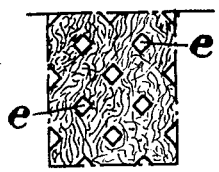
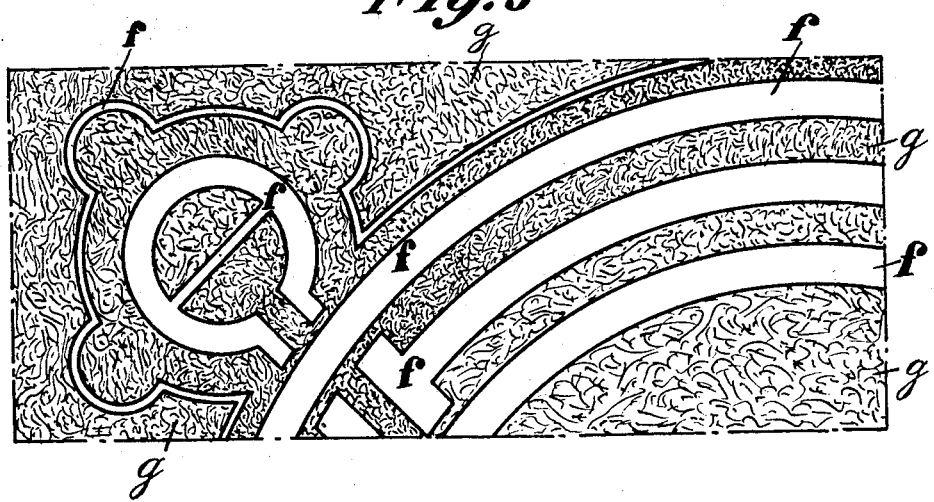

1,812,948

UNITED STATES PATENT OFFICE

CARL HERMANN HACKLÄNDER, OF WERMELSKIRCHEN, GERMANY

CARPET OR RUG

Application filed September 17, 1928, Serial No. 306,529, and in Germany September 17, 1927.

The object of the present invention is to produce a composite floor rug, mat or the like which is pliable and soft and yet sufficiently stable to maintain permanently its original shape and retain the different layers in their original relative positions, and the invention consists in providing the article with a facing and a backing, said backing being composed of a plurality of layers of fabric which are consolidated by spaced impressions made so as to cause the layers to adhere.

Figs. 1 and 2 of the accompanying drawings are perspective sectional views of two different types of mats, Figs. 3 and 4 are horizontal sections taken on the lines 3—3 and 4—4 respectively, and Fig. 5 is a top view of the backing provided with ornamental impressions.

The mat, rug or similar article is composed of a facing $d$ of any suitable type which is sewn or otherwise connected to a backing composed of two or more layers $a$ and $b$, made of any suitable fabric, which are consolidated in known manner by means of spaced impressions so as to stiffen the article and prevent a relative displacement of the layers. The impressions may be made with sufficient force to bring about an adhesive intermeshing of the fibres of the different layers without any cementing medium. With some kinds of materials, however, a cementing medium is preferably employed.

The impressions may take the form of parallel, staggered stipples $c$ as shewn in Figs. 1 and 3, squares or diamonds $e$ as shewn in Figs. 2 and 4, or ornamental outlines $f$ as shewn in Fig. 5. Any other suitable form of impressions may be employed.

I wish it to be understood that the connection by means of an adhesive and by means of spaced impressions, of paper layers for use as a filling in mats and rugs, and of fabric and paper as a floor covering, is already known, and does not per se form part of the invention.

I claim:—

A composite floor mat or rug comprising a facing and a backing interconnected at the edges, and a filling composed of fabric and attached by spaced impressions with said backing.

CARL HERMANN HACKLÄNDER.